(12) United States Patent
Hokkirigawa et al.

(10) Patent No.: US 6,673,762 B2
(45) Date of Patent: *Jan. 6, 2004

(54) CONTAMINATED SURFACE POLISHING-WASHING DETERGENT COMPOSITION

(75) Inventors: Kazuo Hokkirigawa, Yonezawa (JP); Motoharu Akiyama, Nagano-ken (JP); Noriyuki Yoshimura, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 69 days.

This patent is subject to a terminal disclaimer.

(21) Appl. No.: 10/125,800

(22) Filed: Apr. 18, 2002

(65) Prior Publication Data

US 2002/0155975 A1 Oct. 24, 2002

(30) Foreign Application Priority Data

Apr. 19, 2001 (JP) ........................................ 2001-121610

(51) Int. Cl.⁷ .............................. C11D 3/00; C11D 9/00; C11D 17/00; C11D 17/08; C23G 3/22
(52) U.S. Cl. ........................ 510/397; 510/395; 510/418; 510/421; 510/426; 510/245; 510/256
(58) Field of Search ................................. 510/236, 395, 510/397, 418, 421, 426, 245, 256

(56) References Cited

U.S. PATENT DOCUMENTS

| 2,733,138 | A | * | 1/1956 | Clark ........................... 51/303 |
| 4,284,533 | A | | 8/1981 | Imamura et al. |
| 4,466,932 | A | | 8/1984 | Koyama et al. |
| 5,916,499 | A | | 6/1999 | Murayama et al. |
| 6,494,928 | B1 | * | 12/2002 | Hokkirigawa et al. ........ 51/303 |

FOREIGN PATENT DOCUMENTS

| EP | 0 178 164 | 4/1986 |
| JP | 2-80497 | 3/1990 |
| JP | 6-271838 | 9/1994 |

OTHER PUBLICATIONS

"Studies of the surface area and porosity of activated carbons prepared from rice husks", Nevinyalçin and Vahdettin Sevinç, *CARBON*, vol. 38 (2000), pp. 1943–1945.

Article: *Development of Hard and Porous Carbon Material "RB Ceramics" Using Rice Bran as a Starting Material*; (Translation from "Zairyou Kagaku", vol. 17, No. 6, pp. 24 to 27, May 1997); Kazuo Hokkirigawa; 10 pages.

* cited by examiner

Primary Examiner—Yogendra N. Gupta
Assistant Examiner—John M Petroncio
(74) Attorney, Agent, or Firm—Flynn, Thiel, Boutell & Tanis, P.C.

(57) ABSTRACT

A contaminated surface polishing-washing detergent composition comprises a polishing media and a dispersion medium wherein at least a part of the polishing media is made of a fine powder of an RB ceramic and/or CRB ceramic. The composition is effective in polishing-washing the surfaces of a precision-worked base material, and after the polishing-washing, the particles of metal oxides and the particles of removed burrs and the cutting metal chips are simply separated from the composition by use of the difference in specific gravity to re-use it by recycling.

7 Claims, 1 Drawing Sheet

CONTAMINATED SURFACE POLISHING-WASHING DETERGENT COMPOSITION

TECHNICAL FIELD

Figure 1:
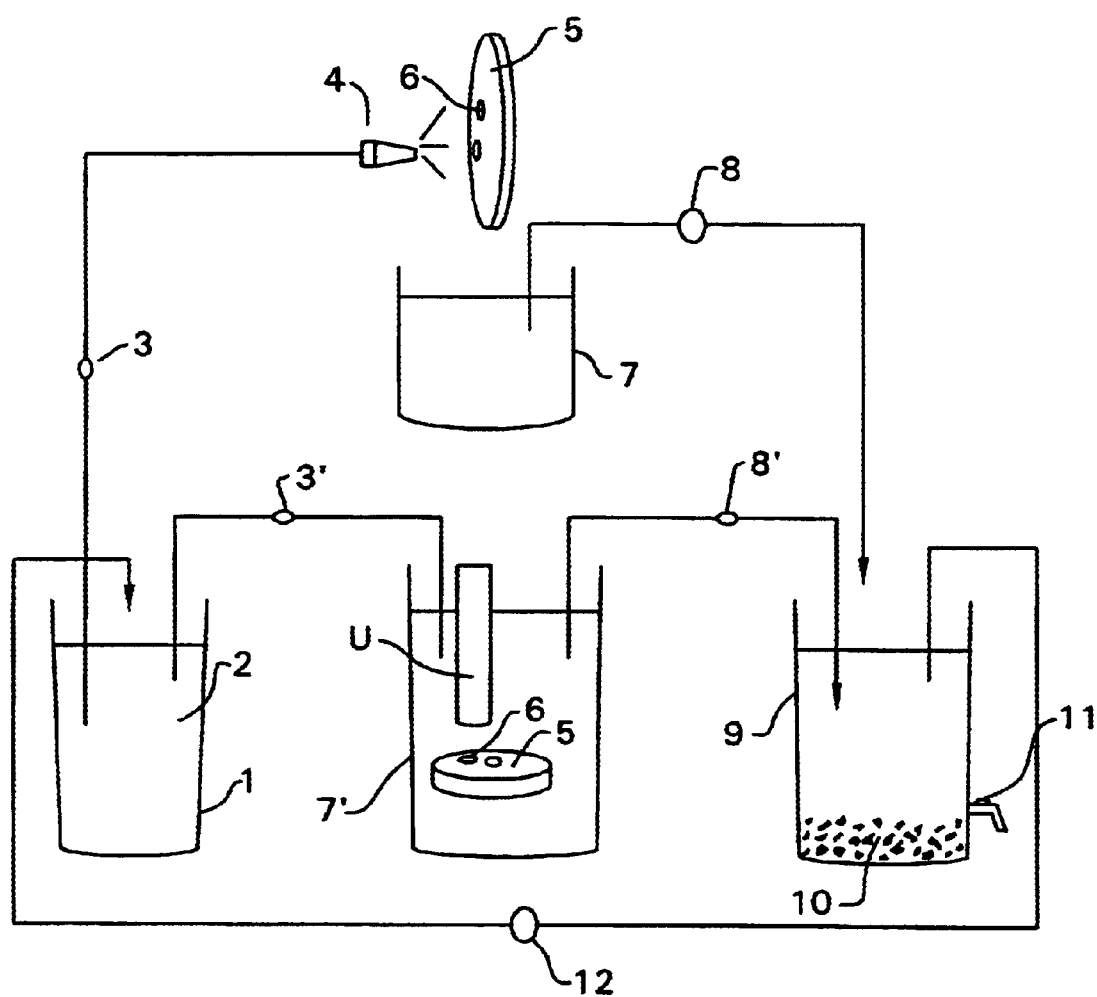

The invention relates to a contaminated surface polishing-washing detergent composition for removing the particles of oxides formed upon working and the particles of removed burrs and cutting metal chips that are left on precision-worked surfaces such as of turbine blades.

BACKGROUND OF THE INVENTION

The turbine blades are formed, by electrical discharge machining, on the surfaces thereof with a concave-shaped pattern receiving a fluid. At the peripheries of the discharge-machined, concave-shaped pattern, there are left the particles of oxides of an alloy used as a base material and the particles of removed burrs and cutting metal chips. In order to remove the particles of the metal oxides of the alloy and the burrs and the cutting metal chips, it has been usual that polishing-washing is carried out by utilizing a water jet or ultrasonic waves while using a polishing media.

The polishing media is in the form of fine particles and is selected from silica, calcium oxide, aluminium oxide, silicon nitride, silicon carbide, cesium oxide, synthetic or natural diamond, metal silicides, tungsten oxide, titanium nitride, titanium oxide, other types of materials that are harder than an alloy used as a constituent base material for turbine blade, and mixtures thereof.

However, there arise the problems that if a hard polishing media such as of diamond particles is used, the particles may be intruded into the surfaces of the base material for the turbine blade, and that polishing may not proceed satisfactorily when using a relatively soft polishing media.

Further, the particles of metal oxides of an alloy used as a base material for the turbine blade or the particles of removed burrs and the cutting metal chips have substantially the same specific gravity as the polishing media, with the attendant problem that it is difficult to separate the particles of the metal oxides and the particles of the removed burrs and the cutting metal chips from a polishing media solution composition containing the particles of the metal oxides of the alloy and the particles of the removed burrs and cutting metal chips. Further, since the specific gravity of those media is high in respect to water as a fluid, there is the problem that upon making a mixed fluid containing the media, it is difficult to obtain a mixture in which the media keeps mixed uniformly in the long term since the media starts to separate indefinably due to different specific gravity and depending on the rate of the media contained in the mixture.

SUMMARY OF THE INVENTION

In the practice of the invention, there is provided a contaminated surface polishing-washing detergent composition using a hard, light RB ceramic and/or CRB ceramic, which composition is re-usable by recycling as a polishing media solution composition after efficient polishing-washing of the surface of a precision-worked base material and removal of the particles of metal oxides and the particles of removed burrs and the cutting metal chips in a simple way from the polishing media solution composition after the polishing-washing by utilizing the difference in specific gravity.

The contaminated surface polishing-washing detergent composition of the invention could solve the above problems, in which an RB ceramic and/or CRB ceramic in the form of a fine power whose bulk specific gravity ranges about 1.25 to 1.35 ($g \cdot cm^{-3}$) (the bulk specific gravity is measured such that the test piece described in JIS R 1601.4 is subjected to the measuring method of bulk specific gravity described in JIS R 7222.7 and it is to be noted that the RB ceramic and/or CRB ceramic is so porous that only a bulk specific gravity can be measured) is used as a polishing media.

More particularly, the RB ceramic and/or CRB ceramic is porous, has such a hardness that the Vickers' hardness is about 400 or over, can be divided into a fine powder having a size of approximately 1 $\mu$m, is not so hard as diamond and is not thus intruded into an alloy in the surfaces of the base material, and is small in bulk specific gravity. Accordingly, if such a ceramic is dispersed in an aqueous surfactant solution having substantially the same specific gravity to provide a polishing media solution composition, the particles of metal oxides and particles of removed burrs and the cutting metal chips can be settled only by allowing the solution to stand after polishing-washing. The separation of the resultant precipitate by filtration makes it possible to provide a refreshed polishing media solution composition for recycling.

The RB ceramic and CRB ceramic used in the invention are those materials prepared according to the following process.

The porous carbon material that is obtained by using rice bran produced at 900,000 tons per year in Japan and at 33,000,000 tons per year in the world is known according to the studies made by Kazuo Hokkirigawa, one of co-inventors of this application (see "Functional Materials" May 1997, Vol. 17, No. 5. Pp. 24 to 28).

In this literature, reference is made to a carbon material (hereinafter referred to as RB ceramic) and the preparation thereof, in which the material is obtained by blending and kneading defatted bran derived from rice bran and a thermosetting resin, followed by drying a compact obtained by pressure forming and subsequently baking the dried compact in an atmosphere of an inert gas.

According to this method, the difference in contraction ratio between the size of the pressure formed compact and the size of the final molded compact obtained by baking in the inert gas atmosphere is at 25%, which makes it substantially difficult to make a precise molded compact. A ceramic (CRB ceramic) improved in the ratio has now been developed. The RB ceramic and CRB ceramic individually have the following general properties.

DETAILED DESCRIPTION OF THE INVENTION

The polishing media used in the invention should comprise fine particles of the RB ceramic and/or CRB ceramic. In the practice of the invention, conventional polishing media may be used in combination.

The polishing media used in combination include silica, calcium oxide, aluminium oxide, silicon nitride, silicon carbide, cesium oxide, synthetic or natural diamond, a metal silicide, tungsten oxide, titanium nitride, titanium oxide, other types of materials that are harder than a base material constituting a body to be worked, and mixtures thereof.

The polishing-washing composition used in the invention can be used for a polishing-washing method using a water jet or ultrasonic waves. Both polishing-washing methods are well known in the art and are not described in detail herein.

With the contaminated surface polishing-washing detergent composition of the invention, when a dispersion medium containing polishing media and obtained after polishing-washing is repeatedly reused, the difference in specific gravity is utilized, and thus, the dispersion medium solution is allowed only to stand, whereupon the particles of metal oxides formed during the course of working and the particles of removed burrs and the cutting metal chips settle from the dispersion medium solution containing the polishing media. The resultant precipitate is removed by a method such as filtration to obtain a fresh polishing media solution composition, which can be recycled.

The polishing media used in combination, such as silica, calcium oxide, aluminium oxide, silicon nitride, silicon carbide, cesium oxide, synthetic or natural diamond, a metal silicide, tungsten oxide, titanium nitride, titanium oxide or the like, cannot be removed only by allowing the solution to stand, and is supplemented in an amount corresponding to that contained in the precipitate, followed by recycling in a similar way.

As is particularly shown in FIG. 1, a polishing media solution composition 2 is pumped up from a storage tank 1, in which the polishing media solution composition 2 is placed, by means of pump 3, and worked portions 6 of a body 5 to be worked are subjected to polishing-washing by means of a water jet gun 4. The polishing media solution composition after the polishing-washing is collected in a temporary storage tank 7 receiving a once treated polishing media solution composition. This is transferred to a standing tank 9 by means of a pump 8. In the standing tank 9, the polishing media solution composition, which contains the particles of metal oxides and the particles of removed burrs and the cutting metal chips formed in the course of the processing over about 1 to 24 hours is allowed to stand. The particles of the metal oxides and the particles of the removed burrs and the cutting metal chips, in most cases, have a specific gravity of approximately 4.0 to 7.0, whereas the bulk specific gravity of the RB ceramic and/or CRB ceramic used as the polishing media of the invention is at approximately 1.3 to 1.4. In addition, the solvent for the polishing media used has a specific gravity of approximately 1.1 to 1.4. Eventually, a precipitate 10 is formed only of the particles of the metal oxides and the particles of the removed burrs and the cutting metal chips. Thereafter, a supernatant liquid portion in the standing tank 9 is recycled, by means of a recycling pump 12, to the storage tank 1 as a polishing media solution composition containing the RB ceramic and/or CRB ceramic that is a polishing media of the invention. It will be noted that the precipitate may be appropriately withdrawn from a precipitate withdrawal port 11.

Furthermore, in another embodiment, there may be used a ultrasonic wave tank 7' capable of imposing ultrasonic vibrations in place of the water jet gun 4. The polishing media solution composition after having used over a given time in the ultrasonic wave tank 7' is passed to the standing tank 9 by means of a pump 8'. In the standing tank 9, the polishing media solution composition containing the particles of metal oxides formed in the course of working and the particles of removed burrs and the cutting metal chips is allowed to stand over about 1 to 24 hours, so that the particles of the metal oxides and the particles of the burrs and the cutting metal chips can be separated therefrom.

The RB ceramic and/or CRB ceramic used as the polishing media in the invention should preferably be one which is obtained by baking at relative high temperatures and has a specific gravity of from approximately 1.2 to 1.35.

The solvent used in the invention may be any one which is able to suspend the particles of the polishing media therein, for which water, acids, alcohols and mixtures thereof are preferably used.

Auxiliary additives may be added to the composition containing the polishing media. Potassium chloride, ammonium chloride or a combination thereof may be used as the auxiliary additive, which not only acts to increase the specific gravity of the solution, but also can facilitate the polishing effect of a metal surface with a polishing material.

Moreover, the final pH of the solution can be appropriately adjusted by addition of an acid or a base. The final solution composition can be diluted by adding a solvent to the above parent solution in an amount sufficient to obtain a desired viscosity and a ratio of the solid components. The final ratio of the solid components can be within a range of about 5 to 50 wt %.

In the practice of the invention, surface active agents may be used in order to enhance the dispersability and washing effect. The surface active agents usable in the invention are selected from anionic surface active agents, amphoteric surface active agents, nonionic surface active agents and cationic surface active agents.

Examples of the anionic surface active agent include fatty acid salts such as potassium laurate, potassium myristate, potassium oleate and the like, alkylsulfates such as sodium laurylsulfate, ammonium laurylsulfate, triethanolamine laurylsulfate and the like, alkylbenzenesulfonates such as sodium dodecylbenzenesulfonate, N-acylamino acid salts such as sodium lauroylsarcosine, potassium lauroylsarcosine and the like, alkyl ether carboxylates such as sodium polyoxyethylene tridecyl ether acetate, N-acyltaurine salts such as sodium N-lauroylmethyltaurine, sodium N-cocoylmethyltaurine and the like, N-acylalanine salts such as sodium lauroylmethylalanine, sulfonates such as sodium laurylsulfoacetate, polyoxyethylene alkyl ether sulfates such as sodium polyoxyethylene lauryl ether sulfate, triethanolamine polyoxyethylene alkyl ether sulfate and the like, alkanesulfonates such as sodium tetradecanesulfonate, sodium pentadecanesulfonate and the like, α olefinsulfonates such as sodium tetradecenesulfonate, alkyl phosphates such as sodium laurylphosphate, and polyoxyethylene alkyl ether phosphates such as sodium polyoxyethylene lauryl ether phosphate.

Examples of the amphoteric surface active agent include acetic acid betaine-type agents such as lauryldimethylaminoacetic acid betaine, lauric acid amidopropyldimethylaminoacetic acid betaine and the like, and imidazoline-type agents such as sodium N-coconut oil fatty acid acyl-N-carboxymethyl-N-hydroxyethylethylenediamine.

Examples of the nonionic surface active agent include polyoxyethylene alkyl ethers such as polyoxyethylene lauryl ether, and alkylalkanolamides, and the like. Examples of the cationic surface active agent include alkylammonium salts such as lauryltrimethylammonium chloride, lauryldimethylamine oxide and the like.

The surface active agents not only have stain removability as a detergent, but also enhance the dispersability of the media.

The surface active agent is preferably used in an amount of 0.5 to 6 wt % based on water serving as a dispersion medium. If the amount of a surface active agent is less than 0.5 wt %, detergent power is weak. When the amount exceeds 6 wt %, rinsing properties become worsened. The surface active agents may be used singly or in combination of two or more.

The embodiments of the invention can be summarized as follows.

(1) A polishing-washing composition comprising a polishing media and a dispersion medium, characterized in that at least a part of the polishing media is made of fine powder of an RB ceramic and or CRB ceramic.

(2) A polishing-washing composition as recited in (1) above, wherein the polishing media further comprises, in combination, a fine powder of one or more members selected from the group consisting of silica, calcium oxide, aluminium oxide, silicon nitride, silicon carbide, cesium oxide, synthetic or natural diamond, a metal silicide, tungsten oxide, titanium nitride and titanium oxide.

(3) A polishing-washing composition as recited in (2) above, wherein the ratio by weight of the fine powder of the RB ceramic and/or CRB ceramic to the fine powder of one or more members selected from the group consisting of silica, calcium oxide, aluminium oxide, silicon nitride, silicon carbide, cesium oxide, synthetic or natural diamond, a metal silicide, tungsten oxide, titanium nitride and titanium oxide in the polishing media ranges 30 to 90:70 to 10.

(4) A polishing-washing composition as recited in any one of 1 to 3 above, wherein the fine powder of the RB ceramic and/or CRB ceramic has an average particle size of 1 $\mu$m to 1,000 $\mu$m.

(5) A polishing-washing composition as recited in any one of 1 to 4 above, wherein the dispersion medium for the polishing media is made of an aqueous dispersion medium containing a surface active agent.

(6) A polishing-washing composition as recited in any one of 1 to 5 above, wherein the dispersion medium for the polishing media comprises potassium chloride, ammonium chloride, sodium sulfate or a combination thereof as an auxiliary additive.

(7) A polishing-washing composition as recited in any one of 1 to 6 above, wherein the dispersion medium for the polishing media has a specific gravity of about 1.1 to 1.4.

EXAMPLE 1

(Preparation of CRB Ceramic)

75 kg of defatted bran derived from rice bran and 25 kg of a liquid phenolic resin (resol) were mixed and kneaded while heating to 50° C. to 60° C. A plastic, homogeneous mixture was obtained.

The mixture was subjected to a primary baking at 900° C. in a nitrogen atmosphere in a rotary kiln for 60 minutes. Subsequently, a baked compact obtained was screened through a 100 mesh sieve, thereby obtaining carbonized powders 50 to 250 $\mu$m in particle diameter.

75 kg of thus obtained carbonized powder was mixed and kneaded with 25 kg of a solid phenolic resin (resol) while heating to 100° C. to 150° C. A plastic homogeneous mixture was obtained.

(Preparation of Polishing Media)

Next, the plastic compact was pressure formed into a round body having a diameter of 3 cm at a pressure of 20 Mpa. The die was set at a temperature of 150° C.

The molded compact was removed from the die, and was heated to a temperature of 500° C. in an atmosphere of nitrogen at a heating rate of 1° C./minute and maintained at 500° C. for controller 60 minutes, followed by baking at 900° C. for about 120 minutes.

Subsequently, the temperature was lowered at a cooling rate of 2 to 3° C./minute until reaching 500° C., and upon the temperature dropping below 500° C., they were left to cool by themselves.

The round body having a diameter of 3 cm was placed in a crusher and crushed into pieces. The pieces were more finely crushed by use of a ball mill.

In this way, primary fine particles of the CRB ceramic having an average size of 5 to 10 $\mu$m were obtained.

(Preparation of a Stock Solution of a Polishing Media Solution Composition)

2 kg of the primary fine particles of the CRB ceramic having a bulk density of 1.23 and an average size of 5 $\mu$m, optical filters 2.5 kg of water, 1.5 kg of potassium chloride, 1.0 kg of sodium sulfate, and 0.4 kg of potassium laurate serving as an anionic surface active agent were mixed at room temperature and subjected to a ball mill thereby preparing a polishing media solution composition in the form of a homogenous slurry.

(Preparation of Polishing Media Solution Composition)

The stock solution in the form of the homogeneous slurry was carried to the spot where polishing-washing was performed, and 7.5 kg of water was added to the stock solution and agitated until a uniform composition was obtained to prepare a polishing media solution composition. The dispersion medium for the polishing media had a specific gravity of about 1.23.

(Polishing-Washing with a Water Jet)

As shown in FIG. 1, a polishing media solution composition 2 was pumped up from a storage tank 1, in which the polishing media solution composition 2 was placed, by means of a pump 3, followed by polishing-washing of worked portions 6, subjected to electrical discharge machined, of a turbine blade 5 to be worked through a water jet gun 4.

The polishing media solution composition 2 after the polishing-washing was collected in a temporary storage tank 7 where a used polishing media solution composition was received. The thus collected polishing media solution composition after the polishing-washing contained the particles of metal oxides formed in the course of the working and the particles of removed burrs and the cutting metal chips. This was passed to a standing tank 9 by means of a pump 8. In the standing tank 9, the polishing media solution composition containing the particles of the metal oxides formed upon the machining and the particles of the removed burrs and the cutting metal chips was allowed to stand over about 8 hours.

The particles of the metal oxides and the particles of the removed burrs and the cutting metal chips, respectively, had a specific gravity of approximately 4.0 to 7.0. Because the RB ceramic and/or CRB ceramic used as the polishing media of the invention has a bulk specific gravity of approximately 1.23 and the dispersion medium for the polishing media also has a specific gravity of 1.23, only the particles of the metal oxides and the particles of the removed burrs and the cutting metal chips were permitted to settle quickly. The polishing media solution composition containing the RB ceramic and/or CRB ceramic used as the polishing media of the invention was recycled from a supernatant liquid portion in the standing tank 9 to the storage tank 1 by means of a recycling pump 12.

EXAMPLE 2

(Preparation of CRB Ceramic)

75 kg of defatted bran derived from rice bran and 25 kg of a liquid phenolic resin (resol) were mixed and kneaded while heating to 50° C. to 60° C. A plastic, homogeneous mixture was obtained.

The mixture was subjected to a primary baking at 900° C. in a nitrogen atmosphere in a rotary kiln for 60 minutes. Subsequently, a baked compact obtained was screened through a 100 mesh sieve, thereby obtaining carbonized powders 50 to 250 $\mu$m in particle diameter.

75 kg of thus obtained carbonized powder was mixed and kneaded with 25 kg of a solid phenolic resin (resol) while heating to 100° C. to 150° C. A plastic homogeneous mixture was obtained.

(Preparation of Polishing Media)

Next, the plastic compact was pressure formed into a round body having a diameter of 3 cm at a pressure of 20 Mpa. The die was set at a temperature of 150° C.

The molded compact was removed from the die, and was heated to a temperature of 500° C. in an atmosphere of nitrogen at a heating rate of 1° C./minute and maintained at 500° C. for 60 minutes, followed by baking at 550° C. for about 120 minutes.

Subsequently, the temperature was lowered at a cooling rate of 2 to 3° C./minute until reaching 500° C., and upon the temperature dropping below 500° C. they were left to cool by themselves.

The round body having a diameter of 3 cm was placed in a crusher and crushed into pieces. The pieces were more finely crushed by use of a ball mill.

In this way, primary fine particles of the CRB ceramic having an average size of 5 to 10 µm were obtained.

(Preparation of a Stock Solution of a Polishing Media Solution Composition)

2 kg of the primary fine particles of the CRB ceramic having a bulk density of 1.25 and an average size of 5 µm, silica fine power having an average size of 5 µm, 3 kg of water, 1.5 kg of potassium chloride, 1.5 kg of sodium sulfate, and 0.5 kg of potassium laurate serving as an anionic surface active agent were mixed at room temperature and subjected to a ball mill to prepare a stock solution of a polishing media solution composition in the form of a homogenous slurry. The dispersion medium for the polishing media had a specific gravity of about 1.25.

(Polishing-Washing in a Ultrasonic Tank)

As shown in FIG. 1, a polishing media solution composition 2 was pumped up from a storage tank 1, in which the polishing media solution composition 2 was placed, by means of a pump 3', and placed in a ultrasonic tank 7' wherein ultrasonic vibrations were imposed by means of a ultrasonic vibration device U. In the ultrasonic tank 7', worked portions 6, which had been machined by electrical discharge, of a turbine blade 5 to be worked was subjected to polishing-washing.

The polishing media solution composition in the ultrasonic tank 7' which was used over a given time contained the particles of metal oxides formed upon working and the particles of removed burrs and the cutting metal chips. The solution was passed to a standing tank 9 by means of a pump 8'. In the standing tank 9, the polishing media solution composition, which contained the particles of the metal oxide formed upon the working and the particles of the removed burrs and the cutting metal chips, was allowed to stand over about 6 hours.

The particles of the metal oxides and the particles of the removed burrs and the cutting metal chips were found to have a specific gravity of about 4.0 to 7.0, respectively. Because the RB ceramic and/or CRB ceramic used as the polishing media of the invention has a bulk specific gravity of approximately 1.25 and the dispersion medium for the polishing media also has a specific gravity of about 1.23, only the particles of the metal oxides and the particles of the removed burrs and the cutting metal chips were permitted to settle quickly. The polishing media solution composition containing the RB ceramic and/or CRB ceramic used as the polishing media of the invention was recycled from a supernatant liquid portion in the standing tank 9 to the storage tank 1 by means of a recycling pump 12.

EXAMPLE 3

(Preparation of RB Ceramic)

75 kg of defatted bran derived from rice bran and 25 kg of a liquid phenolic resin (resol) were mixed and kneaded while heating to 50° C. to 60° C. A plastic homogeneous mixture was obtained.

The mixture was subjected to a primary baking at 900° C. in a nitrogen atmosphere in a rotary kiln for 60 minutes. Subsequently, a baked compact obtained was screened through a 100 mesh sieve, thereby obtaining carbonized powders 50 to 250 µm in particle diameter.

(Preparation of Polishing Media)

Next, the carbonized compact was more finely crushed by use of a ball mill to obtain primary fine particles of the RB ceramic having an average size of 5 to 15 µm.

(Preparation of a Stock Solution of a Polishing Media Solution Composition)

2 kg of the primary fine particles of the RB ceramic having a bulk density of 1.30 and an average size of 5 µm, 2 kg of a silica fine powder having an average size of 3 µm, 3 kg of water, 1.0 kg of potassium chloride, 2.1 kg of sodium sulfate, and 0.5 kg of potassium laurate serving as an anionic surface active agent were mixed at room temperature and subjected to a ball mill to prepare a stock solution of a polishing media solution composition in the form of a homogenous slurry.

(Preparation of Polishing Media Solution Composition)

The stock solution in the form of the homogeneous slurry was carried to the spot where polishing-washing was performed, and 7.0 kg of water was added to the stock solution and agitated until a uniform composition was obtained to prepare a polishing media solution composition. The dispersion medium for the polishing media had a specific gravity of about 1.29.

(Polishing-Washing with Water Jet)

As shown in FIG. 1, a polishing media solution composition 2 was pumped up from a storage tank 1, in which the polishing media solution composition 2 was placed, by means of a pump 3, followed by polishing-washing of portions 6, subjected to electrical discharge machining, of a turbine blade 5 to be worked through a water jet gun 4.

The polishing media solution composition 2 after the polishing-washing was collected in a temporary storage tank 7 where a used polishing media solution composition was received. The thus collected polishing media solution composition after the polishing-washing contained the particles of metal oxides formed in the course of the working and the particles of removed burrs and the cutting metal. This was passed to a standing tank 9 by means of a pump 8. In the standing tank 9, the polishing media solution composition containing the particles of the metal oxides formed upon the working and the particles of the removed burrs and the cutting metal chips was allowed to stand over about 8 hours.

The particles of the metal oxides and the particles of the removed burrs and the cutting metal chips, respectively, had a specific gravity of approximately 4.0 to 7.0. Because the RB ceramic used as the polishing media of the invention has a bulk specific gravity of approximately 1.30 and the dispersion medium for the polishing media also has a specific gravity of approximately 1.29, the particles of the metal oxides, the particles of the removed burrs and the cutting metal chips and silica fine power were permitted to settle quickly. The polishing media solution composition containing the RB ceramic used as the polishing media of the invention was recycled from a supernatant liquid portion in the standing tank 9 to the storage tank 1 by means of a recycling pump 12.

A fresh silica fine powder was supplemented to the polishing medial solution composition substantially in the same amount as the precipitated silica fine powder, followed by continuing the polishing-washing operations.

The contaminated surface polishing-washing detergent composition according to the invention makes use of an RB ceramic and/or CRB ceramic which is an eco-friendly material, so that the surface of a precision-worked surface can be efficiently polishing-washed. After completion of the polishing-washing, the particles of metal oxides and the particles of removed burrs and the cutting metal chips can be simply separated from the polishing media solution composition by use of the difference in specific gravity to provide a convenient contaminated surface polishing-washing detergent composition which can be re-used by recycling thereof.

What is claimed is:

1. A contaminated surface polishing-washing detergent composition, characterized by comprising a polishing media and a dispersion medium wherein at least a part of the polishing medium is made of fine powder of an RB ceramic and/or CRB ceramic.

2. The contaminated surface polishing-washing detergent composition according to claim 1, wherein said polishing media further comprises, in combination, a fine powder of one or more members selected from the group consisting of silica, calcium oxide, aluminium oxide, silicon nitride, silicon carbide, cesium oxide, synthetic or natural diamond, a metal silicide, tungsten oxide, titanium nitride and titanium oxide.

3. The contaminated surface polishing-washing detergent composition according to claim 2, wherein the ratio by weight of the fine powder of the RB ceramic and/or CRB ceramic to the fine powder of one or more members selected from the group consisting of silica, calcium oxide, aluminium oxide, silicon nitride, silicon carbide, cesium oxide, synthetic or natural diamond, a metal silicide, tungsten oxide, titanium nitride and titanium oxide in the polishing medium ranges 30 to 90:70 to 10.

4. The contaminated surface polishing-washing detergent composition according to claim 1, wherein the fine powder of the RB ceramic and/or CRB ceramic has an average particle size of 1 $\mu$m to 1,000 $\mu$m.

5. The contaminated surface polishing-washing detergent composition according to claim 1, wherein the dispersion medium for the polishing media is made of an aqueous dispersion medium containing a surface active agent.

6. The contaminated surface polishing-washing detergent composition according to claim 1, wherein the dispersion medium for the polishing media comprises potassium chloride, ammonium chloride, sodium sulfate or a combination thereof as an auxiliary additive.

7. The contaminated surface polishing-washing detergent composition according to claim 1, wherein the dispersion medium for the polishing media has a special gravity of about 1.1 to 1.4.

* * * * *